United States Patent
Kikuchi et al.

[11] Patent Number: 6,124,686
[45] Date of Patent: Sep. 26, 2000

[54] HORIZONTAL DEFLECTION CIRCUIT

[75] Inventors: Ken Kikuchi, Tokyo; Junzo Watanabe, Kanagawa; Ban Kawamura, Kanagawa; Hidetaka Honji, Kanagawa, all of Japan

[73] Assignee: Sony Corporation, Tokyo, Japan

[21] Appl. No.: 09/133,992

[22] Filed: Aug. 14, 1998

[30] Foreign Application Priority Data

Aug. 18, 1997 [JP] Japan ................................. 9-221366

[51] Int. Cl.[7] ............................ G09G 1/04; H01J 29/70
[52] U.S. Cl. ......................... 315/408; 315/371; 315/369
[58] Field of Search ................................ 315/408, 371, 315/369, 387

[56] References Cited

U.S. PATENT DOCUMENTS

| | | | |
|---|---|---|---|
| 4,206,388 | 6/1980 | Ishigaki et al. | 315/371 |
| 4,513,228 | 4/1985 | Teuling | 315/408 |
| 4,733,141 | 3/1988 | Watanuki | 315/371 |
| 5,416,389 | 5/1995 | Merlo et al. | 315/370 |
| 5,714,849 | 2/1998 | Lee | 315/408 |

FOREIGN PATENT DOCUMENTS 2141883  1/1985  United Kingdom ............. H04N 3/18

*Primary Examiner*—Seungsook Ham
*Assistant Examiner*—John Patti
*Attorney, Agent, or Firm*—Frommer Lawrence & Haug, LLP.; William S. Frommer

[57] ABSTRACT

A horizontal deflection circuit is provided in which a large retrace pulse voltage applied to a horizontal deflection yoke can be taken to reduce the deflection current and which is capable of easily performing horizontal image size adjustment and distortion adjustment. A parallel connection of a switching element, a damper diode, and a resonance capacitor is connected in series to a parallel connection of another switching element, another damper diode, and another resonance capacitor, and power is supplied from the connection point via a fly-back transformer. The comparison value of the retrace pulse voltages applied across both ends of the switching elements is fed back through a switching element control circuit to the switching element so that the deflection current of the horizontal deflection yoke is controlled.

6 Claims, 6 Drawing Sheets

HORIZONTAL DEFLECTION CIRCUIT

BACKGROUND OF THE INVENTION

1. Field of the Invention

The present invention relates to a horizontal deflection circuit for use in a television display apparatus using a cathode ray tube (CRT).

2. Description of the Related Art

As shown in FIG. 1, a horizontal deflection circuit used in an ordinary television set is constructed such that it supplies saw tooth current to a horizontal deflection yoke while adjusting pincushion distortion by a diode modulation circuit, and a fly-back transformer which generates a high voltage to be supplied to a CRT is a load.

In general, a transistor is used as a switching element for horizontal output. Therefore, the fundamental operation of horizontal deflection in a horizontal deflection circuit using a transistor such as that shown in FIG. 1 will now be described.

In FIG. 1, when a positive horizontal driving pulse is applied to the base and a horizontal output transistor 31 is turned on, collector current flows while increasing linearly via the primary winding of a fly-back transformer 36, and positive deflection current flows through a horizontal deflection yoke 34. Next, when the horizontal output transistor 31 is turned off, the collector current becomes zero, but charging current flows from the horizontal deflection yoke 34 to resonance capacitors 33 and 53 while the combined inductance of the primary coil of the fly-back transformer 36 and the horizontal deflection yoke 34 is resonating with the resonance capacitors 33 and 53, and then discharging current for discharging it flows to the horizontal deflection yoke 34. However, since damper diodes 32 and 52 are connected to the horizontal deflection yoke 34, this resonance phenomenon stops at this stage, reverse current from the horizontal deflection yoke 34 does not flow to the resonance capacitors 33 and 53 but flows through the damper diodes 32 and 52.

The above-described operation is described below mathematically. Here, if the maximum amplitude (a peak-to-peak value, hereinafter referred to as a PP value) of horizontal deflection current I flowing through the horizontal deflection yoke 34 is denoted as Ipp, the maximum voltage of a voltage V applied across both ends of the horizontal deflection yoke 34 is denoted as Vp, the inductance of the horizontal deflection yoke 34 is denoted as L, and the horizontal retrace (hereinafter referred to as retrace) interval is denoted as Tre, then $$V = L(dI/dt) \quad (1)$$

When a retrace pulse can be approximated by a sine-wave curve, then $$Vp = (\pi/2) L Ipp/Tre \quad (2)$$

Meanwhile, when the CRT to be used and the horizontal deflection yoke 34 are determined, the energy of a deflection magnetic-field required for the horizontal deflection yoke 34 to scan an electron beam is uniquely determined by the shape, high-voltage conditions, and the like of the CRT. Since the magnetic energy possessed by the current I flowing to the inductance L is $(\frac{1}{2})LI^2$, $LIpp^2$ represents the deflection efficiency of the horizontal deflection yoke 34. If this deflection efficiency is denoted as W, $$LIpp^2 = W \quad (3)$$

On the basis of equations (2) and (3), $$IppVp = (\pi/2)W/Tre \quad (4)$$

When W and Tre are constant in equation (4), the horizontal deflection current Ipp is inversely proportional to the retrace pulse voltage Vp across both ends of the horizontal deflection yoke 34.

In a horizontal deflection circuit, which has been used conventionally, such as that shown in FIG. 1, since Vp of the retrace interval is always smaller than the voltage across both ends of the switching element, Vp is limited by the switching element. Therefore, when, for example, the horizontal deflection frequency becomes twice the normal case, as in a television set free from flicker, Tre is reduced by half. Therefore, if Vp is not changed in terms of the withstand voltage performance of the switching element, Ipp becomes twice as great, thus causing a power loss in each element of the circuit to be increased. Therefore, the cost of the circuit, including each element, is inevitably increased because this power loss must be compensated for.

Also, in the conventional horizontal deflection circuit such as that shown in FIG. 1, in a case in which a high-voltage load is varied sharply, for example, in a case in which on a screen such that horizontal and vertical white lines are displayed at even intervals on a black screen called crosshatch, a screen is displayed such that the high-voltage load is very heavy while the horizontal white lines are displayed, and the high-voltage load is very light in a part where only the white vertical lines after that are displayed, since one end of the primary winding of the fly-back transformer 36 is connected to the S-shaped adjustment capacitors 55 and 35 through the horizontal deflection yoke 34, the load current variation on the primary side of the fly-back transformer 36 due to the variation of the high-voltage load appears as the variation of the current of the horizontal deflection yoke 34. This causes what is called "coging" such that the vertical lines immediately after the white horizontal lines on the screen vibrate from side to side to occur. Therefore, a damping circuit 56 for reducing the coging is connected in parallel to both ends of the S-shaped adjustment capacitor 55.

SUMMARY OF THE INVENTION

The present invention has been achieved to solve the above-described problems. An object of the present invention is to provide a horizontal deflection circuit in which a large retrace pulse voltage applied to a horizontal deflection yoke can be taken to reduce the deflection current, which can easily perform horizontal image size adjustment and distortion adjustment, and which makes the above-described coging hard to occur.

To achieve the above-described object, according to one aspect of the present invention, there is provided a horizontal deflection circuit, comprising: a first parallel circuit, one end of which is grounded, in which a first switching element, a first damper diode, and a first resonance capacitor are connected in parallel to each other; a second parallel circuit, one end of which is connected to the other end of the first parallel circuit, in which a second switching element, a second damper diode, and a second resonance capacitor are connected in parallel to each other; a power-supply source for supplying DC power, through a primary winding of a fly-back transformer, to the connection point in which the other end of the first parallel circuit and one end of the second parallel circuit are connected; a horizontal deflection yoke connected to the other end of the second parallel circuit; an S-shaped adjustment capacitor, one end of which is connected to the other end of the horizontal deflection yoke and the other end of which is grounded; and switching element control means for controlling the off start time and the off period of the second switching element.

The switching element control means preferably feeds back a comparison value between the voltage across both ends of the first switching element in the horizontal retrace interval and the voltage across both ends of the second switching element to the second switching element so that the deflection current of the horizontal deflection yoke is adjusted.

The switching element control means preferably feeds back a comparison value between the first detection voltage in a horizontal retrace interval and the sum of the first and second detection voltages to the second switching element in order to adjust the deflection current of the horizontal deflection yoke.

According to another aspect of the present invention, there is provided a horizontal deflection circuit, comprising: a first parallel circuit in which a first switching element, a first damper diode, and a first resonance capacitor are connected in parallel to each other; a second parallel circuit, one end of which is connected to one end of the first parallel circuit, in which a second switching element, a second damper diode, and a second resonance capacitor are connected in parallel to each other; grounding means for grounding the connection point in which one end of the first parallel circuit and one end of the second parallel circuit are connected; a power-supply source for supplying DC power, through a primary winding of a fly-back transformer, to the connection point in which one end of a horizontal deflection yoke and one end of a primary winding of a fly-back transformer are connected to the other end of the second parallel circuit; an S-shaped adjustment capacitor, one end of which is connected to the other end of the horizontal deflection yoke and the other end of which is connected to the other end of the first parallel circuit; and switching element control means for controlling the off start time and the off period of the first switching element.

The above and further objects, aspects and novel features of the invention will become more apparent from the following detailed description when read in connection with the accompanying drawings.

DETAILED DESCRIPTION OF THE PREFERRED EMBODIMENTS

Figure 2:
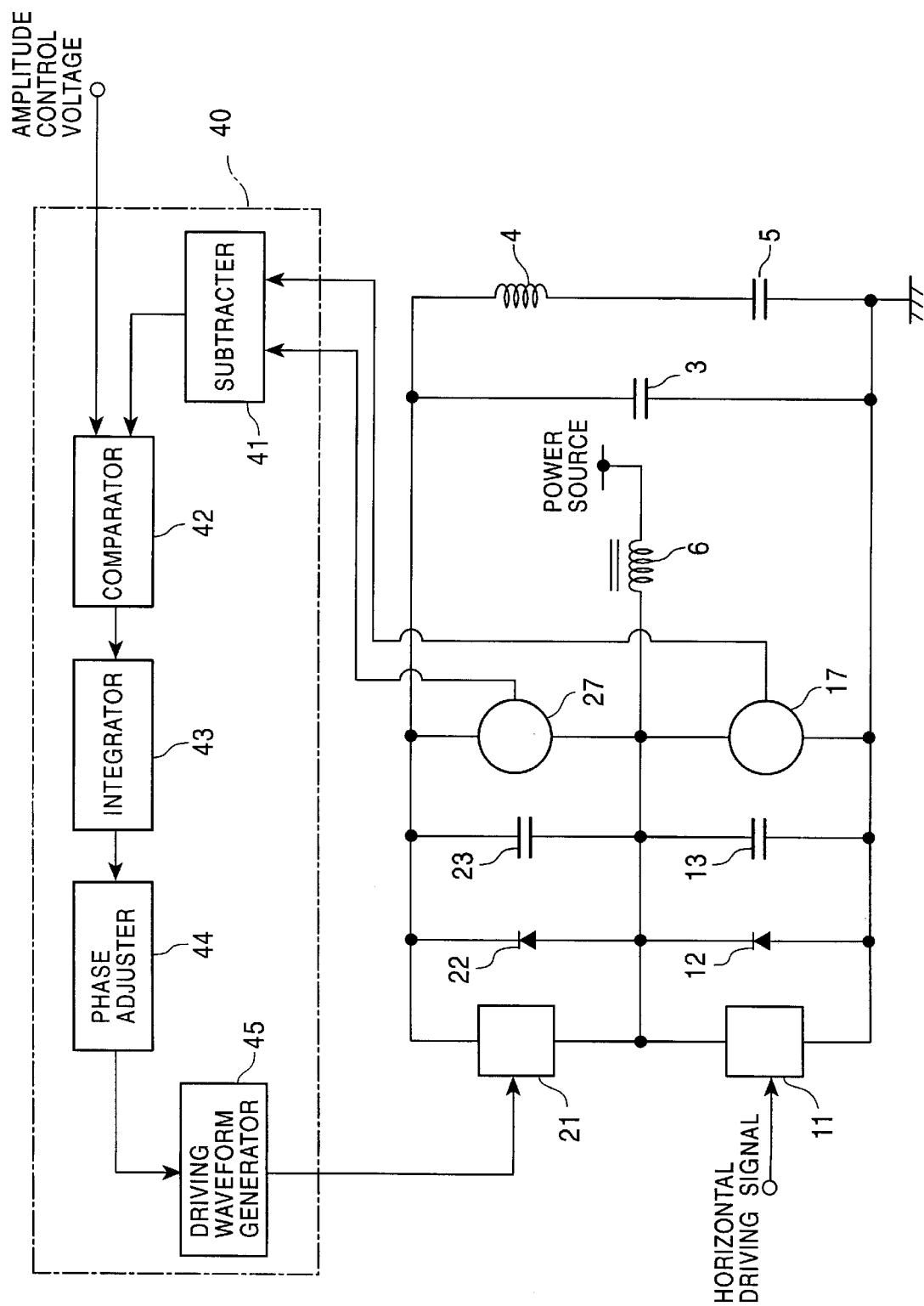
FIG. 2 is a circuit diagram of an embodiment of a horizontal deflection circuit according to the present invention.

The embodiments of the present invention will be described below in detail with reference to the accompanying drawings. FIG. 2 is a fundamental circuit diagram of a horizontal deflection circuit according to an embodiment of the present invention.

As shown in FIG. 2, the horizontal deflection circuit of this embodiment is such that a parallel circuit of a horizontal output switching element 11, a damper diode 12, and a resonance capacitor 13, and a parallel circuit of a switching element 21, a damper diode 22, and a resonance capacitor 23 are connected in series, and power is supplied to the connection point via a primary winding of a fly-back transformer 6. The other end of the switching element 11 is grounded, a horizontal deflection yoke 4 is connected to the other end of the switching element 21, and furthermore, an S-shaped adjustment capacitor 5 is connected in series to this horizontal deflection yoke 4, and the other end of the S-shaped adjustment capacitor 5 is grounded.

Furthermore, a resonance capacitor 3 is connected in parallel across both ends of the series connection of the horizontal deflection yoke 4 and the S-shaped adjustment capacitor 5. Such a horizontal deflection circuit comprises pulse reading circuits 17 and 27 for reading the voltage across both ends of the switching elements 11 and 21, respectively, and a switching element control circuit 40 for performing on/off control of the switching element 21 by performing an operation on the basis of the voltage.

Next, referring to FIGS. 2, 3 and 4, a description will be given of the operation of this circuit.

In FIG. 2, a horizontal driving signal is input to the horizontal output switching element 11, causing the horizontal output switching element 11 to be turned on, and at the same time the switching element control circuit 40 is operated to turn on the switching element 21. Thus, both switching elements enter a conducting state, and deflection current flows to the horizontal deflection yoke 4. Meanwhile, the switching element 11 is turned off earlier than the switching element 21, thereby a retrace interval (horizontal retrace interval) starts. During this retrace interval, on/off control of the switching element 21 is performed by the switching element control circuit 40. These series of operations are described using an equivalent circuit by dividing the horizontal deflection period.

<Trace interval a>

Figure 1:
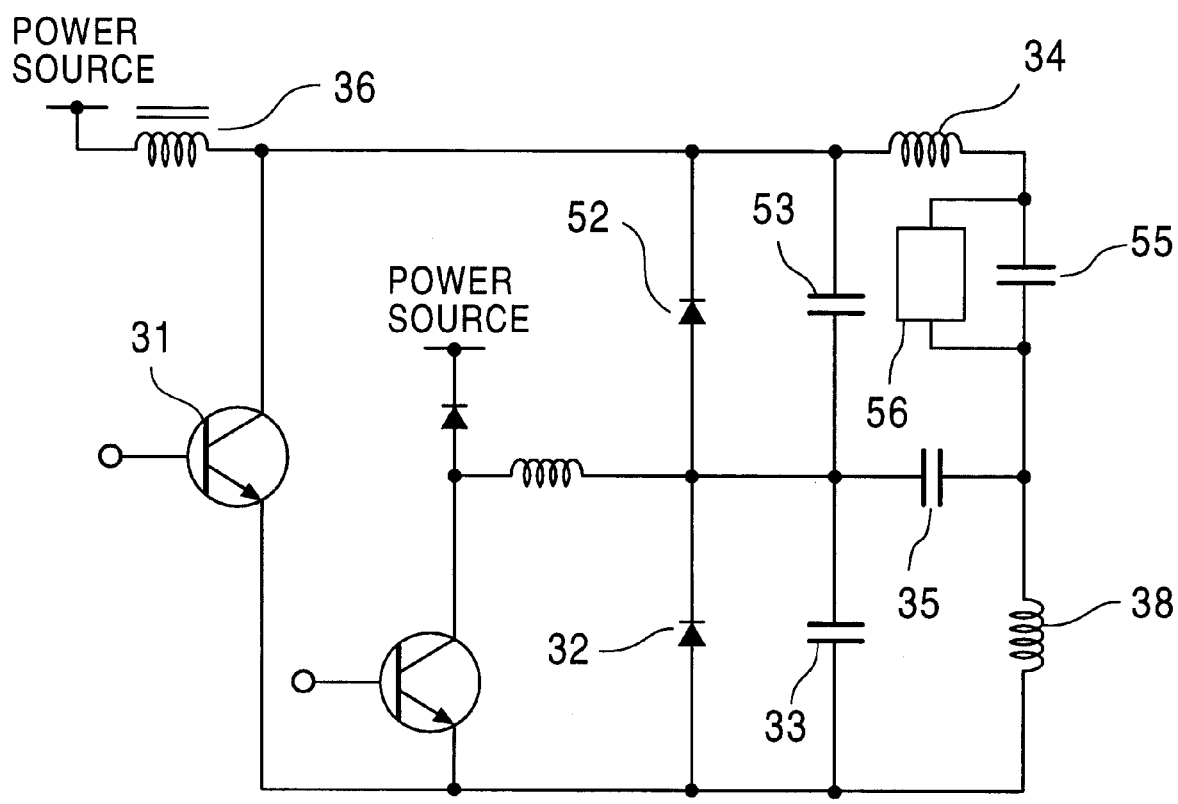
FIG. 1 is a circuit diagram showing an example of a conventional horizontal deflection circuit.
Figure 3D:
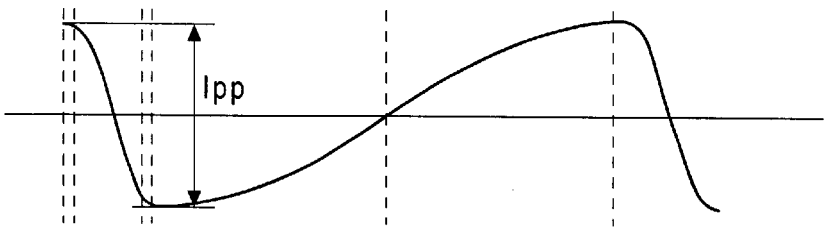
Figure 4A:
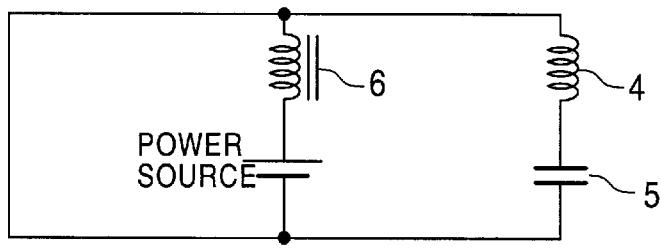
FIGS. 4A, 4B, and 4C are equivalent circuit diagrams illustrating the operation of the horizontal deflection circuit of the embodiment of the present invention.

An equivalent circuit in retrace interval a is as in FIG. 4A in a state in which both of the switching elements 11 and 21 are conducting, which is the same shape as that of a horizontal deflection circuit having one stage of a switching element which has been used conventionally (in this operating state, the equivalent circuit of the horizontal deflection circuit of FIG. 1 is the same as in FIG. 4A). In this case, both the deflection current and the fly-back transformer current increase at an inclination in accordance with the voltage across both ends of the S-shaped adjustment capacitor 5 and the power-source voltage, respectively. The waveform of the deflection current of the horizontal deflection yoke 4 in this case is shown in FIG. 3D.

<Initial period of retrace interval>

To enter a retrace interval, initially, the switching element 11 is turned off in accordance with a horizontal driving signal. At this time, since the switching element 21 is still conducting, the equivalent circuit is as in FIG. 4B, and there are two resonance capacitors 3 and 13, this being similar to the conventional horizontal deflection circuit. The current flowing through the fly-back transformer 6 and the horizontal deflection yoke 4 flows to the resonance capacitors 3 and 13, causing a voltage to develop across both ends of the resonance capacitors 3 and 13, thereby the current begins to flow in the reverse direction. That is, the voltage and the current waveform, including the resonance operation, are those in interval b of FIGS. 3A to 3D.

<Off period of the switching element 21 in the retrace interval>

Figure 4B:
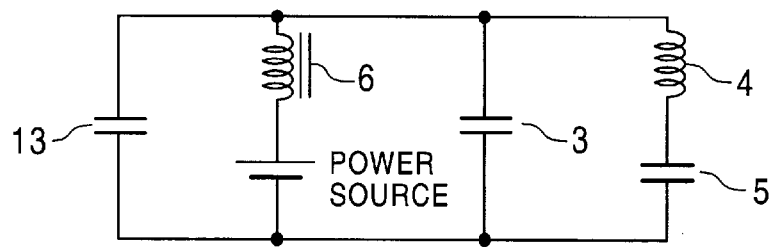

After the deflection current reaches zero in the latter half of the retrace interval, even if the switching element 21 is turned off, the equivalent circuit remains as in FIG. 4B because there is the damper diode 22 and no change occurs. However, the equivalent circuit when the switching element 21 is turned off before the deflection current reaches zero in the former half of the retrace interval becomes as in FIG. 4C, and another resonance capacitor 23 is connected in series to the horizontal deflection yoke 4.

Figure 3A:
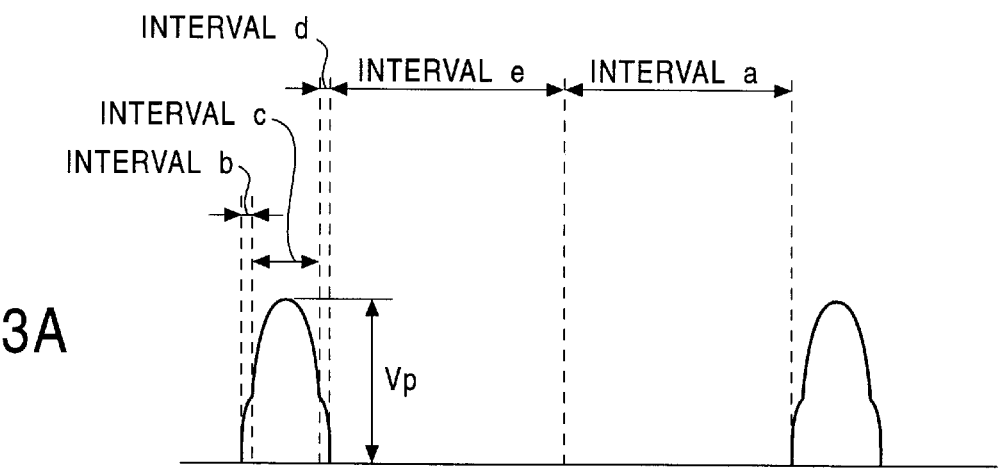
FIGS. 3A, 3B, 3C and 3D are voltage and current waveform views of each section of the horizontal deflection circuit of the embodiment of the present invention.
Figure 3B:
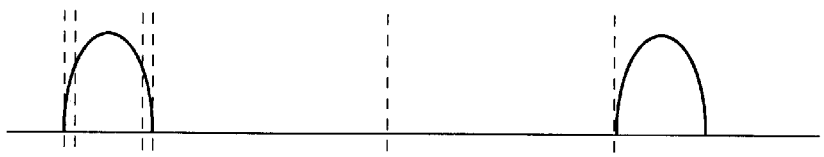
Figure 3C:
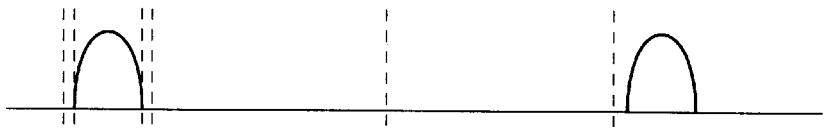
Figure 4C:
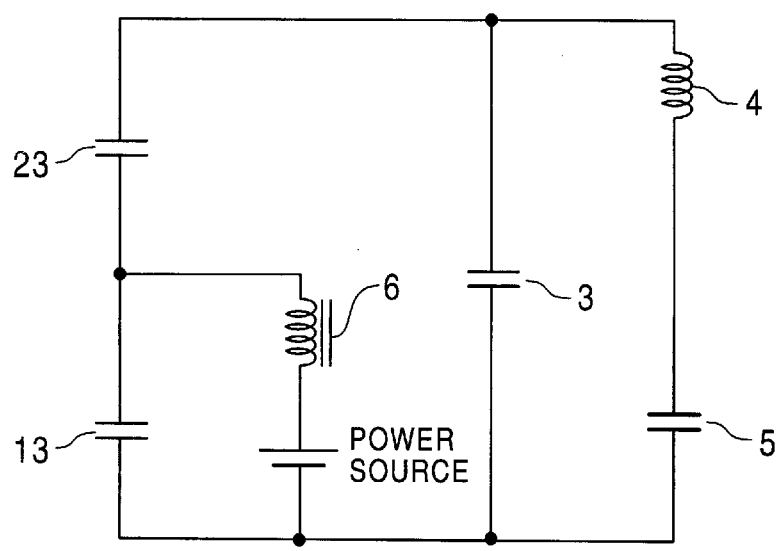

Since the deflection current flows also to the resonance capacitor 23, a voltage also develops across both ends of the resonance capacitor 23, and a pulse voltage larger than that of the pulse at both ends of the switching element 11 can be applied across both ends of the horizontal deflection yoke 4 (see FIG. 3A which shows the voltage waveform with respect to the ground of the switching element 21).

Here, the peak value of the retrace pulse voltage across both ends of the switching element 11 can be uniquely determined by the power-source voltage, the retrace time, and the ratio of retrace times, and becomes constant. Therefore, the voltage of this pulse (see FIG. 3B which shows the voltage waveform with respect to the ground of the switching element 11) is raised by the fly-back transformer 6, and can be made to be a high voltage for use in an electron gun of a CRT.

<Latter half of the retrace interval>

The retrace interval ends as a result of the automatic conduction of the damper diode when all the charges which have flowed to the resonance capacitors 3, 13, and 23 flow out, and the voltage across both ends reaches zero (For the sake of simplicity, the diode is an ideal diode).

Here, since the current which flows to the resonance capacitor 23 is always smaller than the current which flows to the resonance capacitor 13, the charge of the resonance capacitor 23 becomes extinct earlier, and the damper diode 22 conducts earlier than the damper diode 12. For this reason, the pulse width of the pulse generated across both ends of the switching element 21 becomes narrower than that of the pulse generated across both ends of the switching element 11 (see FIG. 3B, and interval c of FIG. 3C which shows the voltage waveform across both ends of the switching element 21).

Furthermore, when the off timing of the switching element 21 is delayed, the current which flows to the resonance capacitor 23 is reduced further, the pulse width of the pulse at both ends of the switching element 21 also becomes narrower, and the height of the pulse becomes low. That is, by controlling the phase of the off timing of the switching element 21, the retrace pulse voltage applied across both ends of the horizontal deflection yoke 4 can be controlled, and as a result, the amplitude of the deflection current can be varied.

The interval d of FIGS. 3A to 3D is the same as the interval b in the equivalent circuit and therefore, a description thereof has been omitted.

<Trace interval e>

When the damper diode 22 conducts in this way, the circuit returns to the shape of the equivalent circuit of FIG. 4B, and continues a retrace operation similarly to the conventional deflection circuit until the voltage across both ends of the resonance capacitors 3 and 13 reaches zero. At the same time as the end of the retrace, the circuit returns to the shape of the equivalent circuit of FIG. 4A, and enters a trace interval e. In this trace interval e, horizontal deflection current flows in the forward direction from the horizontal deflection yoke 4 to the damper diodes 12 and 22 (see FIG. 3D). In this interval, the switching elements 11 and 21 are placed in a conducting state so as to be in preparation for the next trace interval a.

As described above, as a result of the horizontal deflection current repeating the above-described deflection intervals a, b, c, d, and e, the horizontal deflection yoke 4 forms a horizontal deflection magnetic-field.

Next, a detailed description will be given of a method for adjusting pincushion distortion and an image size by controlling the off timing of the switching element so as to vary the amplitude of the horizontal deflection current.

The maximum amplitude (PP value) Ipp of the horizontal deflection current is proportional to the integration value of the retrace pulse voltage applied across both ends of the horizontal deflection yoke in the retrace interval. However, since this retrace pulse voltage is about 1,200 to 2,200 volts, this is divided into a low voltage which can be processed. This voltage is compared with a reference voltage indicating the amplitude of the horizontal deflection, the difference is integrated, feedback is applied to the driving signal of the switching element so that the integration value becomes zero, thereby controlling the Ipp of the horizontal deflection current with high accuracy. An example of this embodiment is the switching element control circuit 40 shown in FIG. 2.

In FIG. 2, retrace pulse voltages applied across both ends of the switching elements 11 and 21 are detected by the pulse reading circuits 17 and 27, respectively. This detected voltage is such that a retrace pulse voltage is divided using capacitor division or the like. This detected voltage is input to the switching element control circuit 40, and the retrace pulse voltage (voltage-division value) of the switching element 21 is subtracted from the retrace pulse voltage (voltage-division value) of the switching element 11 by using a subtractor 41, such as an operational amplifier. This difference voltage is compared with an amplitude control voltage corresponding to a predetermined horizontal amplitude by a comparator 42. This amplitude control voltage is such that a parabola-shaped voltage for adjusting pincushion distortion is normally added thereto.

Then, the compared voltage is integrated by an integrator 43 to become a DC voltage and is input, as a signal for adjusting the phase (off timing) of the driving signal of the switching element 21, to a phase adjuster 44. A timing pulse formed by the phase adjuster 44 forms a driving signal sufficient for driving the switching element 21 in a driving waveform generator 45. With such a feedback loop, the switching element 21 outputs deflection current while controlling the off timing.

The foregoing is an operation when the closed loop control system of off timing is operating stably. However, depending upon the circuit configuration, a different operation is performed in a transition period, such as the rise time when power is switched on, and therefore, attention must be paid.

In the control system shown in FIG. 2, the area such that the voltage waveform (voltage-division value) of the retrace pulse of the switching element 21 is subtracted from the voltage waveform (voltage-division value) of the retrace pulse of the switching element 11 varies linearly with respect to the amplitude of the deflection current. Then, at switching on of power, the feedback loop operates so that a retrace pulse is not produced at both ends of the switching element 21 until the subtracted area reaches a particular size.

That is, since a retrace pulse is not produced at both ends of the switching element 21 until the retrace pulse at both ends of the switching element 11 reaches a predetermined wave height value, the rise is stable.

Figure 5:
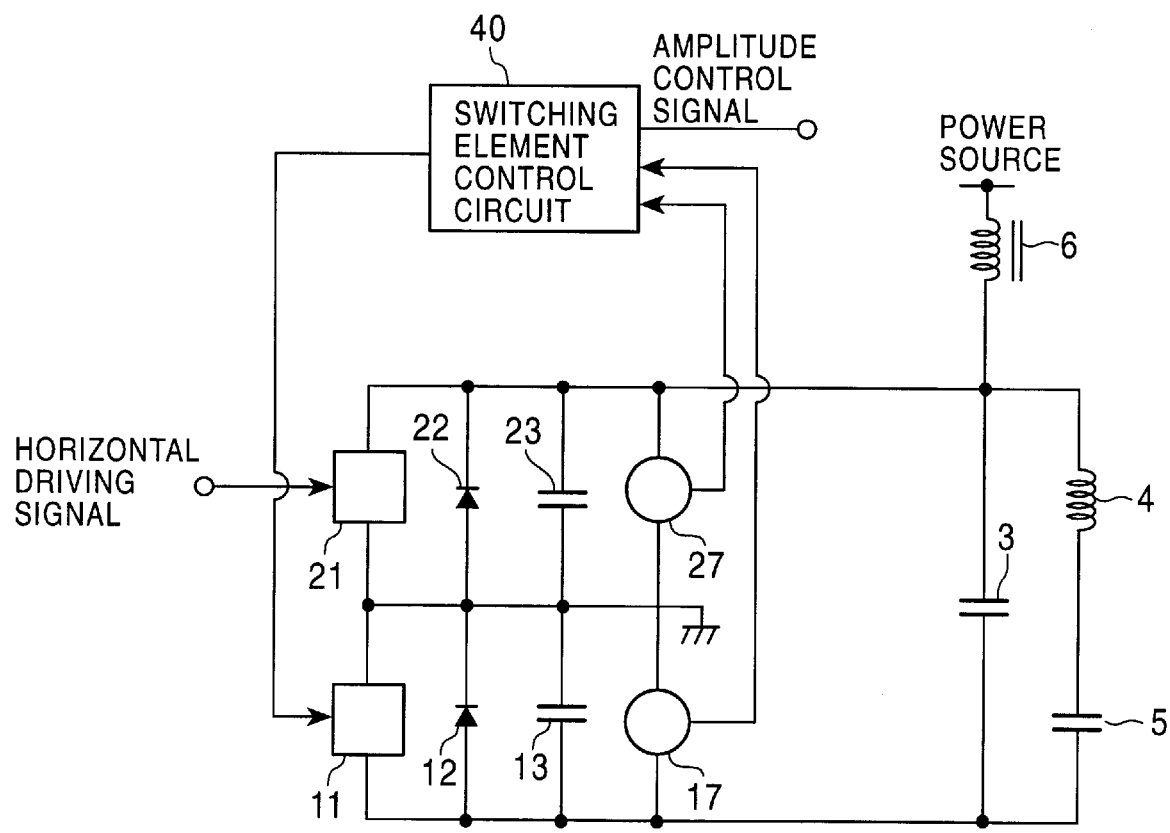
FIG. 5 is a circuit diagram showing another embodiment of the present invention.

In a circuit configuration similar to that of FIG. 2 as the horizontal deflection circuit, the same advantages can be obtained by a circuit such that the power supply point and a grounding point are changed, as shown in FIG. 5. In this horizontal deflection circuit, a parallel circuit of the switching element 11, the damper diode 12, and the resonance capacitor 13, and a parallel circuit of the switching element 21, the damper diode 22, and the resonance capacitor 23 are connected in series, and the connection point is grounded. Supplying of power is performed to the other end of the switching element 21 via the primary winding of the fly-back transformer 6. The switching element 21 connected to this fly-back transformer 6 is driven in accordance with a horizontal driving signal.

The series connection of the horizontal deflection yoke 4 and the S-shaped adjustment capacitor 5 is connected in parallel to the series connection of the resonance capacitor 3, and the switching elements 11 and 12.

In the retrace interval, the off timing of the switching element is controlled to adjust the horizontal image size and pincushion distortion. This is performed by feeding back the difference voltage of the retrace pulse voltages of the switching elements 21 and 11, similarly to that described above in FIGS. 3A to 3D. However, the driving waveform generator output, which becomes a control signal, is input to the one switching element 11, which is not connected to the fly-back transformer 6. The foregoing is a circuit configuration of this circuit, and the operation thereof is almost the same as the circuit operation of FIGS. 3A to 3D, and therefore, a description thereof has been omitted.

Figure 6A:
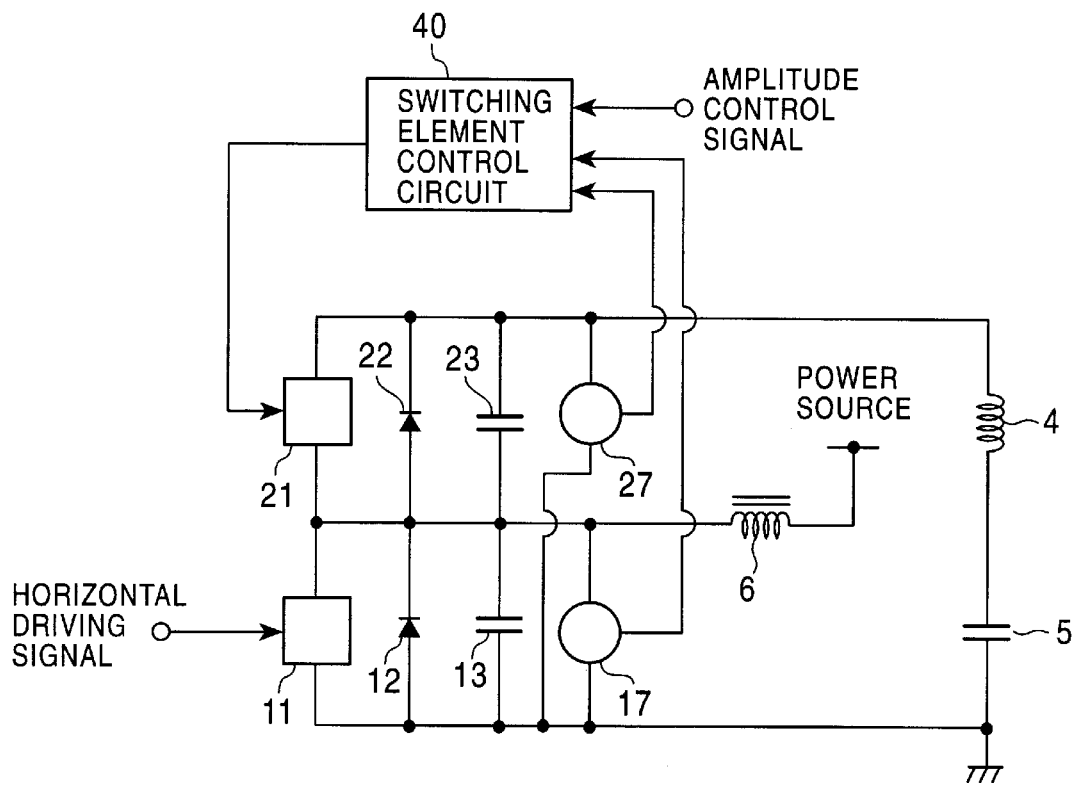
FIGS. 6A and 6B are each a circuit diagram showing the other embodiment of the present invention.
Figure 6B:
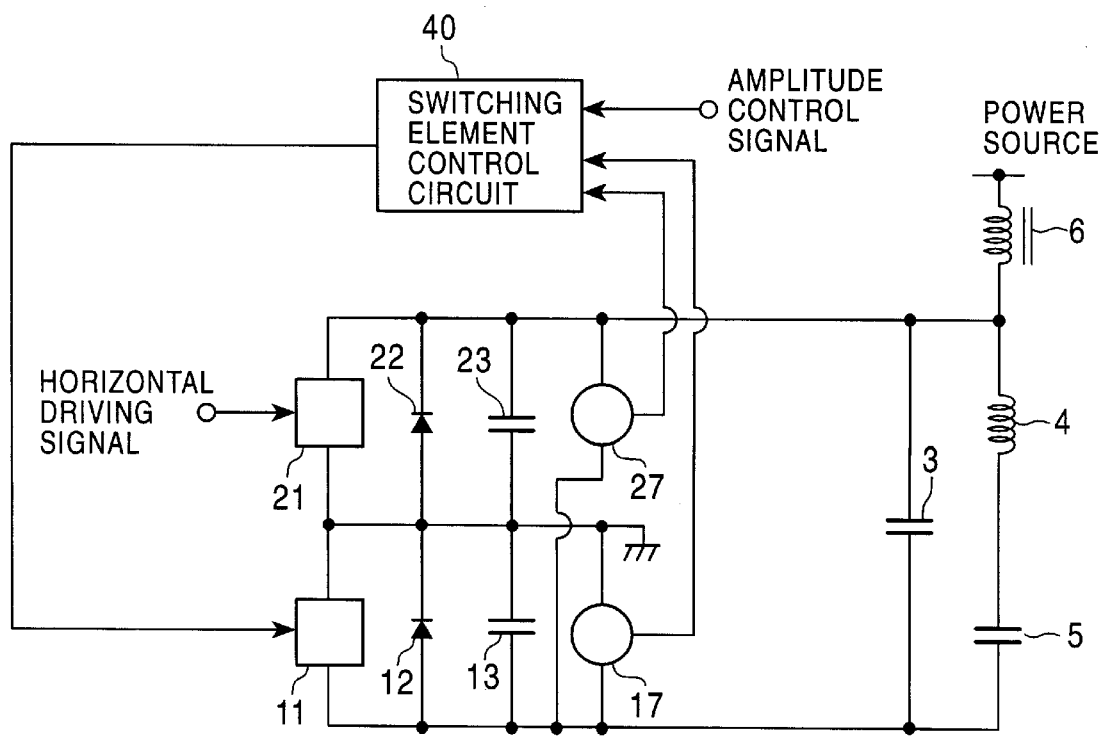

This timing control method for use with the switching element is not limited to the above-described method. For example, as shown in FIGS. 6A and 6B (FIGS. 6A and 6B are similar to FIGS. 2 and 5, respectively. The corresponding components are given the same reference numerals, and a description thereof has been omitted.), it is possible to input to the switching element control circuit 40 a comparison voltage between the voltage across both ends of the switching element 11 and the voltage of the sum of the voltage across both ends of the switching element 21 and the voltage across both ends of the switching element 11 so that a control operation which is the same as that described above is performed, or it is also possible that only the retrace pulse voltage across both ends of the switching element 21 is detected and input to the switching element control circuit 40 such as that shown in FIG. 2, whereby the same control operation as that described above is performed so that the off timing of the switching element 21 is controlled. However, at this time, when power is switched on, the rise time must be controlled separately by, for example, temporarily stopping the operation of the switching element control circuit 40.

In the circuit configuration shown in FIGS. 2 and 6A, also in the case where a high-voltage load variation occurs suddenly when a signal of crosshatch, etc., is displayed, the primary winding of the fly-back transformer 6 is not directly connected to the horizontal deflection yoke 4, and the influence of the load variation upon the primary side is not directly transmitted to the horizontal deflection yoke 4 and the S-shaped adjustment capacitor 5. Therefore, it is very hard for a phenomenon of what is called "coging" on the CRT face to occur.

As has been described above, according to the present invention, while the withstand voltage of a switching element for horizontal output can be low, a retrace pulse voltage applied to the horizontal deflection yoke can be large, the deflection current can be decreased to reduce the power loss of the deflection system, and the horizontal image size adjustment and the distortion adjustment can be performed easily.

Also, by utilizing the fact that the retrace pulse voltage across both ends of the horizontal deflection yoke can be large in comparison with a conventional horizontal deflection circuit, the horizontal retrace interval can be made shorter than in the conventional case. Furthermore, since a circuit configuration is such that an S-shaped adjustment capacitor connected in series to the horizontal deflection yoke is grounded, a component or a circuit may be added between this S-shaped adjustment capacitor and a ground so that various deflection system adjustments can be performed easily.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A horizontal deflection circuit, comprising:
   a first parallel circuit, one end of which is grounded in which a first switching element, a first damper diode, and a first resonance capacitor are connected in parallel to each other;
   a first voltage detection circuit for detecting the voltage across said first switching element and outputting a first detection voltage;
   a second parallel circuit, one end of which is connected to the other end of said first parallel circuit, in which a second switching element, a second damper diode, and a second resonance capacitor are connected in parallel to each other;
   a second voltage detection circuit for detecting the voltage across said second switching element and outputting a second detection voltage;
   a power-supply source for supplying DC power, through a primary winding of a fly-back transformer, to the connection point in which the other end of said first parallel circuit and said one end of said second parallel circuit are connected;
   a horizontal deflection yoke one end of which is connected to the other end of said second parallel circuit;
   an S-shaped adjustment capacitor, one end of which is connected to the other end of said horizontal deflection yoke and the other end of which is grounded; and
   switching element control means for controlling the off start time and the off period of said second switching element, wherein said switching element control means controls said second switching element on the basis of said first and second detection voltages.

2. A horizontal deflection circuit according to claim 1, wherein said switching element control means includes a comparison circuit for comparing said first detection voltage in a horizontal retrace interval with said second detection voltage and outputting a comparison value, and feeds back said comparison value to said second switching element in order to adjust the deflection current of said horizontal deflection yoke.

3. A horizontal deflection circuit according to claim 1, wherein said switching element control means includes a comparison circuit for comparing said first detection voltage in a horizontal retrace interval with the sum of said first and second detection voltages and outputting a comparison value, and feeds back said comparison value to said second switching element in order to adjust the deflection current of said horizontal deflection yoke.

4. A horizontal deflection circuit, comprising:
   a first parallel circuit in which a first switching element, a first damper diode, and a first resonance capacitor are connected in parallel to each other;
   a first voltage detection circuit for detecting the voltage across said first switching element and outputting a first detection voltage;
   a second parallel circuit, one end of which is connected to one end of said first parallel circuit, in which a second switching element, a second damper diode, and a second resonance capacitor are connected in parallel to each other;
   a second voltage detection circuit for detecting the voltage across said second switching element and outputting a second detection voltage;
   a grounding means for grounding the connection point in which one end of said first parallel circuit and said one end of said second parallel circuit are connected;
   a power-supply source for supplying DC power, through a primary winding of a fly-back transformer, to the connection point in which one end of a horizontal deflection yoke and one end of a primary winding of a fly-back transformer are connected to the other end of said second parallel circuit;
   an S-shaped adjustment capacitor, one end of which is connected to the other end of said horizontal deflection yoke and the other end of which is connected to the other end of said first parallel circuit; and
   switching element control means for controlling the off start time and the off period of said second switching element, wherein said switching element control means controls said second switching element on the basis of said first and second detection voltages.

5. A horizontal deflection circuit according to claim 4, wherein said-switching element control means includes a comparison circuit for comparing said first detection voltage in a horizontal retrace interval with said second detection voltage and outputting a comparison value, and feeds back said comparison value to said second switching element in order to adjust the deflection current of said horizontal deflection yoke.

6. A horizontal deflection circuit according to claim 4, wherein said switching element control means includes a comparison circuit for comparing said first detection voltage in a horizontal retrace interval with the sum of said first detection voltage and said second detection voltage and outputting a comparison value, and feeds back said comparison value to said second switching element in order to adjust the deflection current of said horizontal deflection yoke.

* * * * *